US008973579B2

(12) United States Patent
Contino et al.

(10) Patent No.: US 8,973,579 B2
(45) Date of Patent: *Mar. 10, 2015

(54) SELF-CONTAINED MODULAR DEPLOYMENT SYSTEM

(71) Applicant: Avox Systems Inc., Lancaster, NY (US)

(72) Inventors: Joseph Contino, Lancaster, NY (US); Danko A. Kobziar, Williamsville, NY (US); Robert L. Schaeffer, Jr., Cheektowaga, NY (US); Duard Charles Bennett, Kenmore, NY (US)

(73) Assignee: Avox Systems Inc., Lancaster, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,165

(22) Filed: Nov. 19, 2012

(65) Prior Publication Data
US 2013/0074836 A1 Mar. 28, 2013

Related U.S. Application Data

(63) Continuation-in-part of application No. 12/372,918, filed on Feb. 18, 2009, now Pat. No. 8,356,595, which is a continuation of application No. 11/331,476, filed on Jan. 13, 2006, now Pat. No. 8,443,802.

(60) Provisional application No. 60/643,449, filed on Jan. 13, 2005.

(51) Int. Cl.
*A62B 18/08* (2006.01)
*A62B 7/14* (2006.01)
*B64D 11/00* (2006.01)
*A62B 7/08* (2006.01)
*A62B 25/00* (2006.01)

(52) U.S. Cl.
CPC . *A62B 18/08* (2013.01); *A62B 7/14* (2013.01); *A62B 7/08* (2013.01); *A62B 25/005* (2013.01); *B64D 11/00* (2013.01); *B64D 2231/025* (2013.01)
USPC ............. 128/204.29; 128/204.18; 128/204.21

(58) Field of Classification Search
USPC ............. 128/200.24, 204.18, 204.21, 204.29, 128/205.11, 205.25; 244/118.5
See application file for complete search history.

(56) References Cited

U.S. PATENT DOCUMENTS 6,318,364 B1 * 11/2001 Ford et al. ................. 128/204.18
8,356,595 B2 * 1/2013 Schaeffer et al. ......... 128/204.29

* cited by examiner

*Primary Examiner* — Annette Dixon
(74) *Attorney, Agent, or Firm* — Hodgson Russ LLP

(57) ABSTRACT

An apparatus for deploying oxygen masks that includes a pre-packaged modular system that does not require manual repacking of oxygen masks by aircraft technicians. The cartridge is for use with a manifold having a passageway in fluid communication with a source of breathable gas. The cartridge includes an end wall, a sidewall extending from the end wall and terminating at a distal end adjacent to an opening. A flexible member defines a chamber inside the cartridge. The chamber is in fluid communication with the passageway when the cartridge is coupled to the manifold. The flexible member has an outlet. A mask assembly is disposed inside the cartridge. The mask assembly has a hose coupled to the outlet of the flexible member. A cover is removably attached to the distal end of the at least one side wall.

14 Claims, 14 Drawing Sheets

SELF-CONTAINED MODULAR DEPLOYMENT SYSTEM

CROSS-REFERENCE TO RELATED APPLICATIONS

The present application is a continuation-in-part of U.S. Pat. No. 8,356,595 issued on Jan. 22, 2013, which is a continuation of U.S. Pat. No. 8,443,802 filed on May 21, 2013, which claims benefit of U.S. Provisional Patent Application No. 60/643,449 filed on Jan. 13, 2005, titled "Method and Apparatus for Deploying Oxygen Masks," all of which applications are incorporated herein by reference.

FIELD OF THE INVENTION

This invention relates to a method and apparatus for deploying an emergency breathing mask in an aircraft. The apparatus is automatically or manually operable to present the breathing mask to a user upon loss of cabin pressurization.

BACKGROUND OF THE INVENTION

As shown in FIG. 1A, typical emergency breathing mask deployment systems include a generally rectangular shaped storage container 12 carrying a fluid valve assembly 14, one or more oronasal oxygen masks 16 and means, generally indicated at 18, for supporting masks 16 thereon in a stowed condition within container 12. As known to those of ordinary skill in the art, the masks 16 have to be stowed in such a way that they will unfold during deployment without tangling. With the conventional systems, the masks 16 may have to be repacked in the container 12 by aircraft technicians several times during the usable life of the container 12 and/or aircraft. For example, the masks 16 may have to be replaced after a predetermined period of time, the masks may have to be repacked after inspection or they may have to be repacked after a deployment. In order to repack the masks 16 in the container 12, components, which typically include the oxygen tubes 29, reservoir bag 38, elastic strap 34 and lanyards 60, must be carefully folded and coiled as shown in FIG. 1B so that the mask 16 deploys properly and does not become tangled during an emergency situation. The process of repacking masks is time-consuming and costly given the labor rates of aircraft technicians.

Accordingly, there is a need for a method and apparatus that eliminates the need to have aircraft technicians manually repack oxygen masks during service-related replacement of masks. In addition while most masks are mounted in the ceilings of aircraft, some aircraft will require mounting in the sidewalls or as part of a seat assembly. In these aircraft there is a need for an emergency mask system that can be deployed by forces other than gravity. There is also a need for a method and apparatus that meets both needs.

SUMMARY OF THE INVENTION

The present invention meets the above-described need by providing a method and apparatus for presenting oxygen masks that provides a pre-packaged, modular system that does not require manual repacking of oxygen masks by aircraft technicians. The system also provides a force other than gravity for deploying the masks. It is to be understood that the present invention may be used in a ceiling mounted orientation where it would provide a force in addition to gravity for releasing the masks. The system may be embodied as a modular deployment system having an oxygen source, and an embodiment is provided wherein the oxygen source is proximate to and/or attached to the modular deployment system.

DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1A:
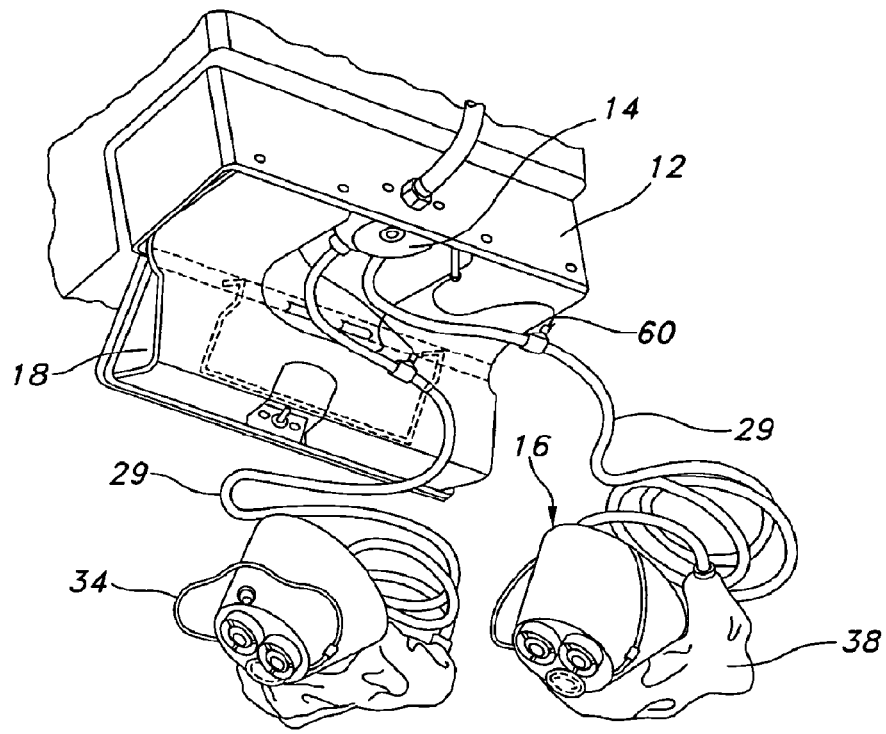
FIG. 1A is a perspective view of a prior art emergency mask deployment system showing the oxygen masks dropped free from the container.
Figure 1B:
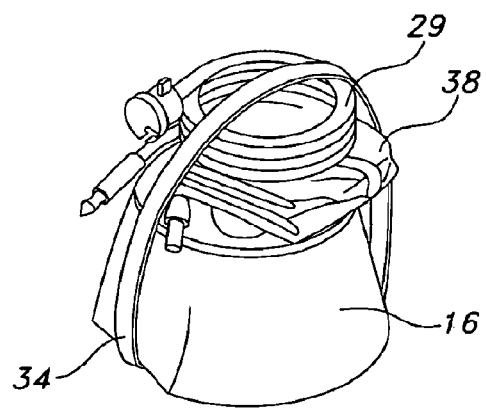
FIG. 1B is a perspective view of an oxygen mask folded for deployment inside the container.
Figure 2:
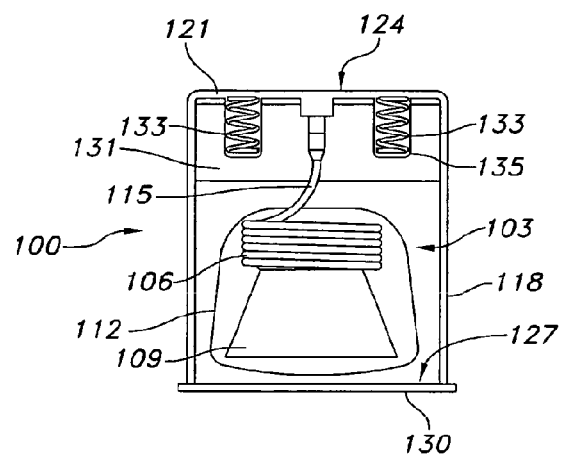
FIG. 2 is a front elevational view of an individual mask cartridge of the present invention.

Referring to FIG. 2, a cartridge 100, which may be in the shape of a cylinder, contains a single oxygen mask assembly 103. As will be evident to those of ordinary skill in the art, the oxygen mask assembly 103 may include the following major components: a folded reservoir bag 106, an oronasal mask 109, a strap 112, and breathing conduit 115. The cartridge 100 is provided with side walls 118 and an end wall 121. The end wall 121 is provided with an opening 124 for receiving a quick connect fitting that is in fluid communication with the conduit on the mask assembly. Opposite from the end wall 121, the cartridge 100 has an opening 127 where the mask 109 exits the cartridge 100 during deployment. The opening 127 may be initially covered or partially covered by a removable substrate 130 which may be provided with a pressure-sensitive adhesive or the like. Alternately, the substrate 130 may be creased, scored, or perforated such that it will split open during deployment of the mask. The substrate 130 covers the opening 127 to hold the mask assembly 103 in position during installation of the cartridge 100 and may also prevent contamination. The cartridge 100 is a pre-packed standalone assembly that is intended to be installed in the field without requiring any handling of individual mask components by aircraft technicians. Accordingly, the cartridge 100 is provided with quick connect oxygen line connections and quick connect mechanical connections such as quarter-turn bayonet (not shown), pin and slot connections (FIG. 6-9), or "push and stab" connections (FIG. 12) that provide for quick installation in the field without the requirement of tools or separate fasteners. However, it is to be understood that the cartridge 100 can also be installed with tools and separate fasteners.

In addition to being a pre-packed modular construction, the cartridge 100 includes a supplemental mask ejection device such as the spring-biased piston 131 shown in FIG. 2. The piston 131 is biased by a pair of coil springs 133 disposed in grooves 135 in the back of the piston 131. When an electrical signal is given or when the oxygen flow is activated, the spring 133 is released from a retention mechanism and provides a force on the piston 131 in the downward direction with respect to the orientation of FIG. 2. This force ejects the mask 109 from its cartridge to present it to the user.

As will be evident to those of ordinary skill in the art, the mask ejection device may be formed as part of the cartridge, as part of the housing or oxygen manifold (as shown and described herein in connection with FIGS. 10-12) or as a part of some or all of the above components. Also, in order to eliminate the ejection device from the cartridge, the cartridge may be provided with an end wall that is responsive to force from an ejection device mounted on the manifold. Also, the cartridge may be formed with one or more openings in the top and the one or more openings may be covered by a flexible covering such that the ejection device may act upon the mask 109 to deploy it.

Figure 3:
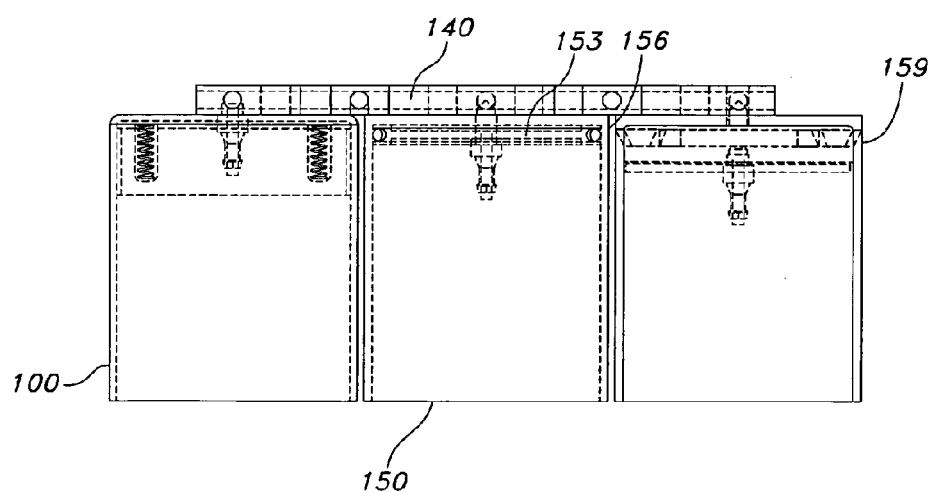
FIG. 3 is an elevational view showing three ports for receiving the individual cartridges.

Turning to FIG. 3, a bank of cartridges are shown. On the left side with respect to the orientation of FIG. 3, cartridge 100 is shown with the mask removed for clarity. As shown, the cartridge 100 includes a quick connect fitting for attaching to a manifold 140. In the other positions along the manifold 140, alternate embodiments for the cartridge are shown. In the middle position, a cartridge 150 is shown. The cartridge 150 includes a piston 153 sealed with O-rings 156. The piston 153 is actuated by the pressure of the oxygen and ejects the mask from its cartridge. In the right hand position, another alternate gas pressure actuated piston is shown with cup seals 159 to form the pressure chamber above the piston.

Figure 4:
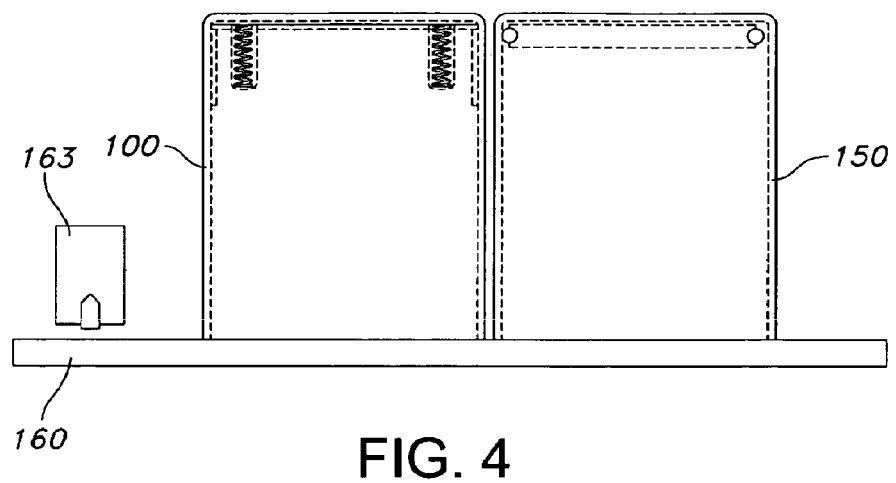
FIG. 4 is an elevational view showing the present invention in relation to an access door.

In FIG. 4, a pair of cartridges 100 and 150 are shown in relation to the door 160 leading to the inside of the aircraft cabin. As shown, the door 160 may be opened by a solenoid-operated actuator 163. As an alternative, the door 160 could be held by a mechanically operated latch capable of being released by the force of the ejection of the mask 109.

Once the door 160 is opened, the mask 109 is ejected from its cartridge by the force of the piston which may be spring-biased or pressure actuated as described above. If the flow of oxygen is initiated when the masks are presented, then the masks may be ejected by pneumatic pressure as described above.

Figure 5:
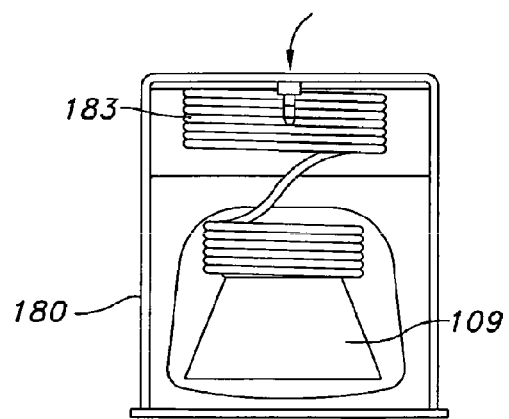
FIG. 5 is an elevational view showing an alternate embodiment of the present invention.

Turning to FIG. 5, in an alternate embodiment of the invention, mask 109 is ejected from cartridge 180 by a bellows chamber 183. When the flow of oxygen is initiated the bellows chamber 183 fills with oxygen causing it to expand and push the mask 109 downward with respect to the orientation of FIG. 5.

Figure 6A:
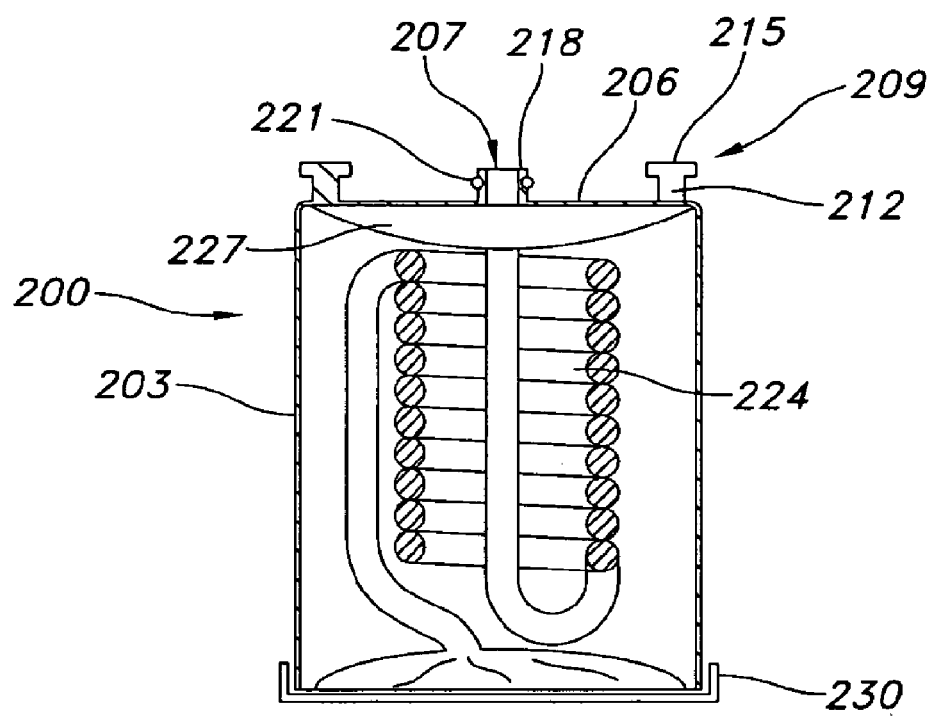
FIG. 6A is an elevational, cross-sectional view of an alternate embodiment of the cartridge of the present invention.

In FIG. 6A, an alternate embodiment of the cartridge is shown. Cartridge 200 includes side walls 203 and an end wall 206. Extending from end wall 206 are a pair of studs 209 that can be used for attaching the cartridge 200 to a support structure. The studs have a body portion 212 and an enlarged head 215 for engaging with a slot having an enlarged opening leading to a slot. By inserting the head 215 into the enlarged opening and rotating the cartridge 200, the body portion 212 can be received and retained by the slot as will be evident to those of ordinary skill in the art.

In the center of the end wall 206 there is an opening 207 surrounded by an adapter 218. The adapter 218 is provided with an O-ring 221 capable of engaging with the oxygen manifold to provide for fluid communication between the oxygen manifold and the oxygen conduit 224 in the cartridge 200. Other connecting means such as quick connects and the like could also be used and the cartridge 200 could therefore be supported from these other structures disposed around the central opening. As shown the adapter 218 leads to a bladder 227 the outlet of which is in fluid communication with the conduit 224. The conduit 224 is coiled above the remaining components such as the reservoir bag, straps, and oronasal mask. A cover 230 is attached to the cartridge 200 at the end opposite from the end wall 206. In operation, the flow of oxygen from the manifold into the bladder 227 causes the bladder 227 to expand and force the mask assembly to push the cover 230 off of the cartridge and causes the mask assembly to exit the cartridge 200.

Figure 6B:
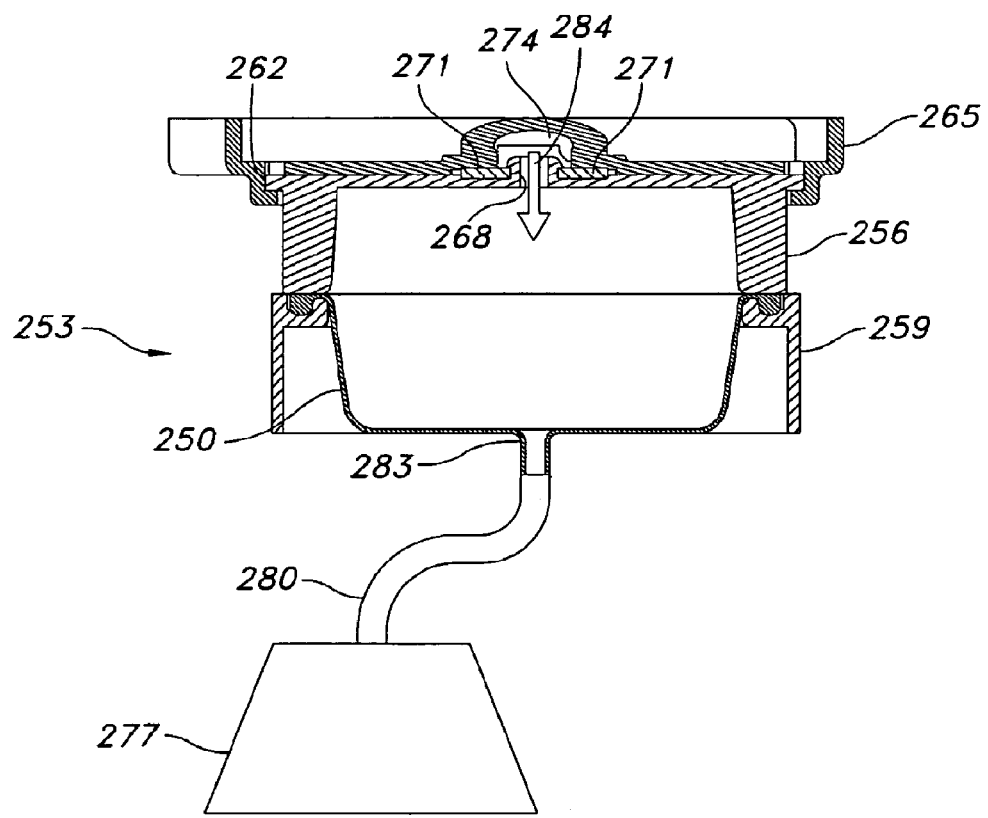
FIG. 6B is an elevational, cross-sectional view of an alternate embodiment of the cartridge shown in FIG. 6A.

In FIG. 6B, a variation of the bladder 227 is shown. A diaphragm 250 is formed from a flexible sheet of material. The diaphragm 250 may be attached on opposite sides of the cartridge 253 at midwall between the top 256 and bottom 259 of the cartridge. The cartridge 253 has a central opening 268 which is surrounded by a gasket 271 when the cartridge 253 is in position. The central opening 268 is in fluid communication with gas passageway 274 in the manifold 265.

A mask assembly 277 (including straps, etc. as described above in connection with FIG. 2) is provided for delivering the breathing gas to the user. A hose assembly 280 connects the mask assembly 277 to a fitting 283 on the diaphragm 250. The mask assembly 277 and hose assembly 280 are folded and stowed in the cartridge 253 prior to use (as shown in FIG. 6A).

As shown in FIG. 6B, upon actuation the flow of breathing gas in the direction of arrow 284 from the manifold 265 causes the diaphragm 250 to move downward with respect to the orientation of FIG. 6B. The force of the diaphragm 250 against the mask assembly 277 causes it to deploy. The force of the diaphragm 250 against the mask assembly 277 provides for deployment of the mask assembly 277 regardless of the location of the cartridge 253 which may include overhead in the ceiling of the aircraft, in the sidewalls of the aircraft, or in the seat assembly.

Figure 7:
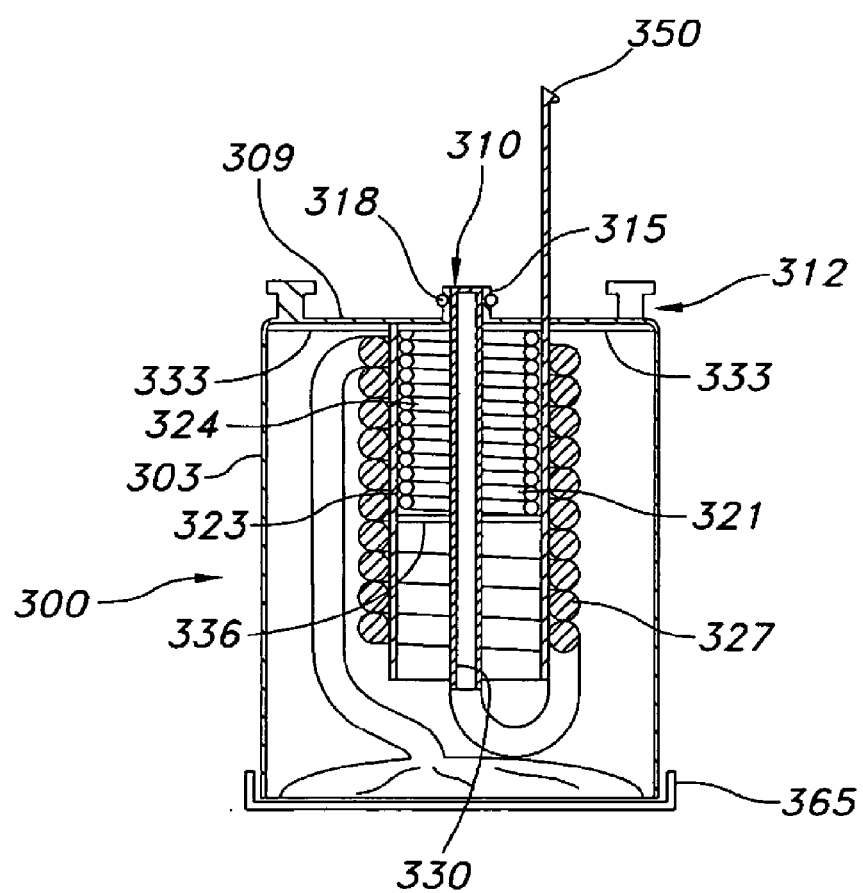
FIG. 7 is an elevational, cross-sectional view of an alternate embodiment of the cartridge of the present invention.

In FIG. 7, an alternate embodiment of the cartridge is shown. Cartridge 300 has side walls 303 and an end wall 309. The end wall 309 may be provided with studs 312 for engaging with support structure on oxygen manifold 308 (FIGS. 8-9) as described above in connection with studs 209. Also, a central opening 310 is surrounded by an adapter 315 having an O-ring 318 disposed thereon. The adapter 315 may be inserted into the oxygen manifold 308 such that a seal is formed by the O-ring 318.

A spring 321 is seated in a retaining member 323. The retaining member 323 may be provided with a major portion having an H-shape in cross-section. The top section 324 holds the spring 321 and prevents it from making contact with the coiled breathing conduit 327. A tube 330 extends between the adapter 315 and the breathing conduit 327 and is disposed through an opening in the center of the retaining member 323. The bottom of the retaining member 323 is hollow and provides additional support for the coiled breathing conduit 327. The top of the retaining member 323 is provided with a flange 333 that extends outwardly. The spring 321 is compressed between the end wall 309 of the cartridge 300 and the dividing wall 336 in the retaining member 323. The spring 321 is biased against the retaining member 323 in the downward direction with respect to the orientation of FIG. 7.

Figure 8:
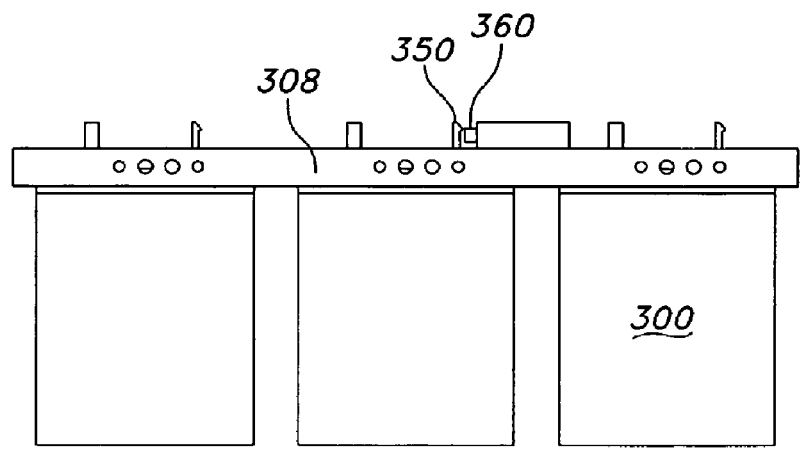
FIG. 8 is a front elevational view of a plurality of cartridges attached to a manifold.
Figure 9:
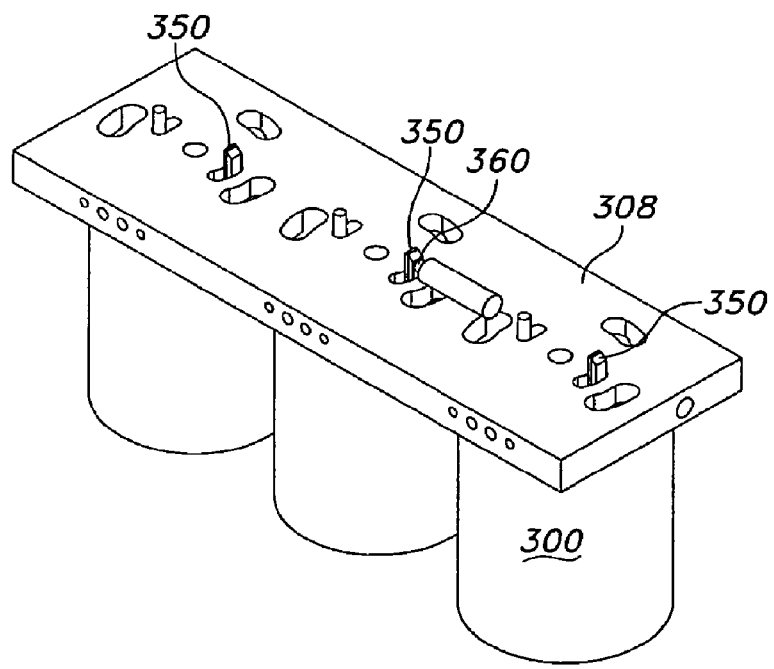
FIG. 9 is a perspective view of the cartridges and manifold shown in FIG. 8.

A latch 350 connected to retaining member 323 holds the spring 321 in the compressed state as shown in FIG. 7. As shown in FIGS. 8-9, the latch 350 is engaged with a surface on the oxygen manifold 308. A solenoid actuated piston 360 (FIGS. 8-9) may be provided to disengage the latch for deployment of the masks. The piston on the solenoid disengages the latch such that the spring is allowed to expand and push into the mask assembly which in turn pushes against the cover 365 to open the end of the cartridge 300. After the cover 365 is released, the mask assembly exits from the cartridge 300.

Figure 10:
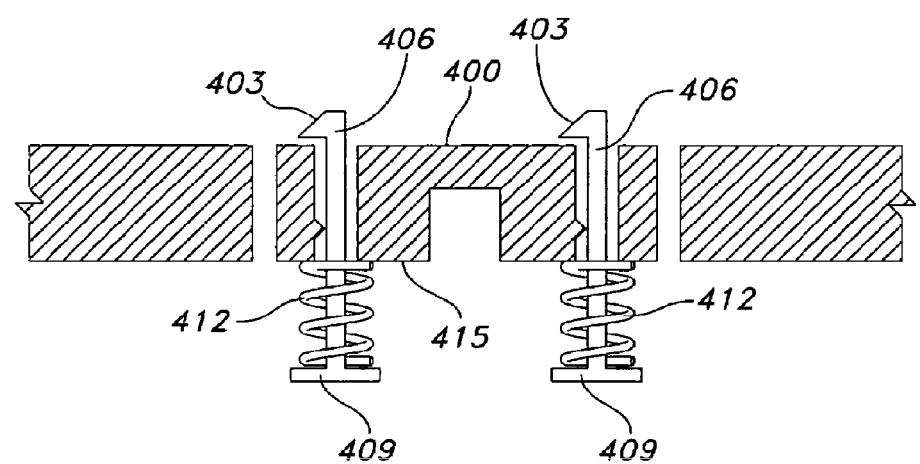
FIG. 10 is a partial elevational cross-sectional view of an alternate embodiment of the manifold.
Figure 11:
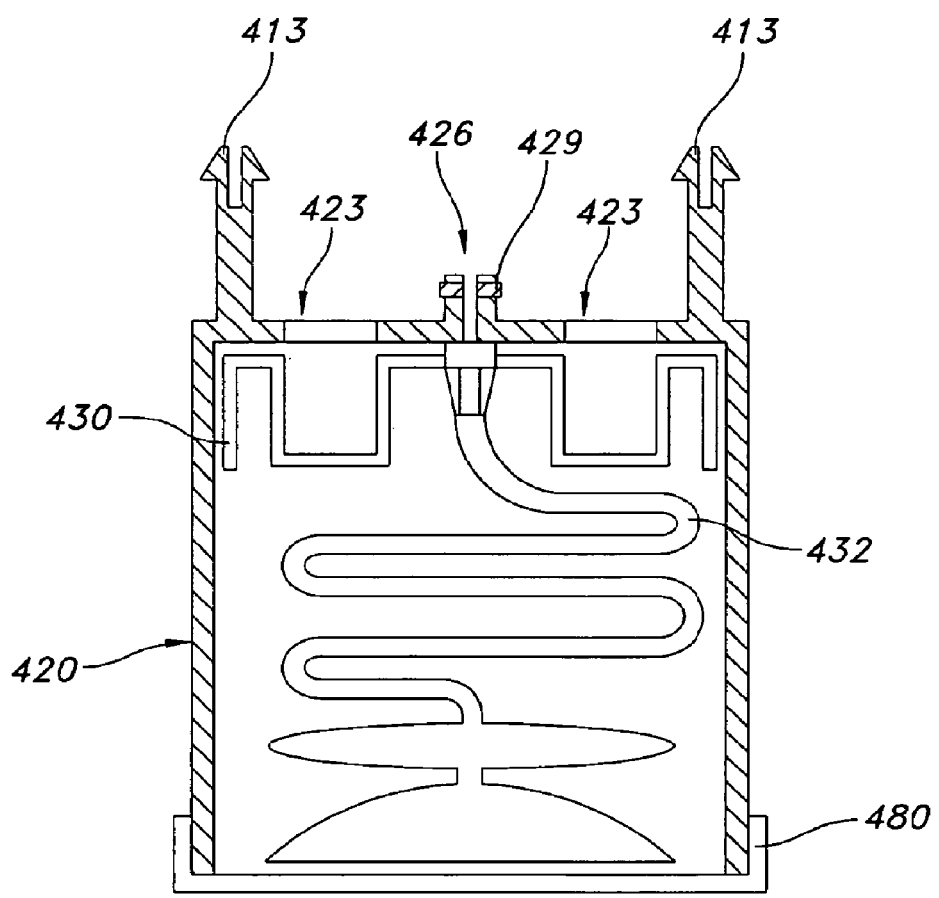
FIG. 11 is a cross-sectional elevational view of an alternate embodiment of the cartridge of the present invention.
Figure 12:
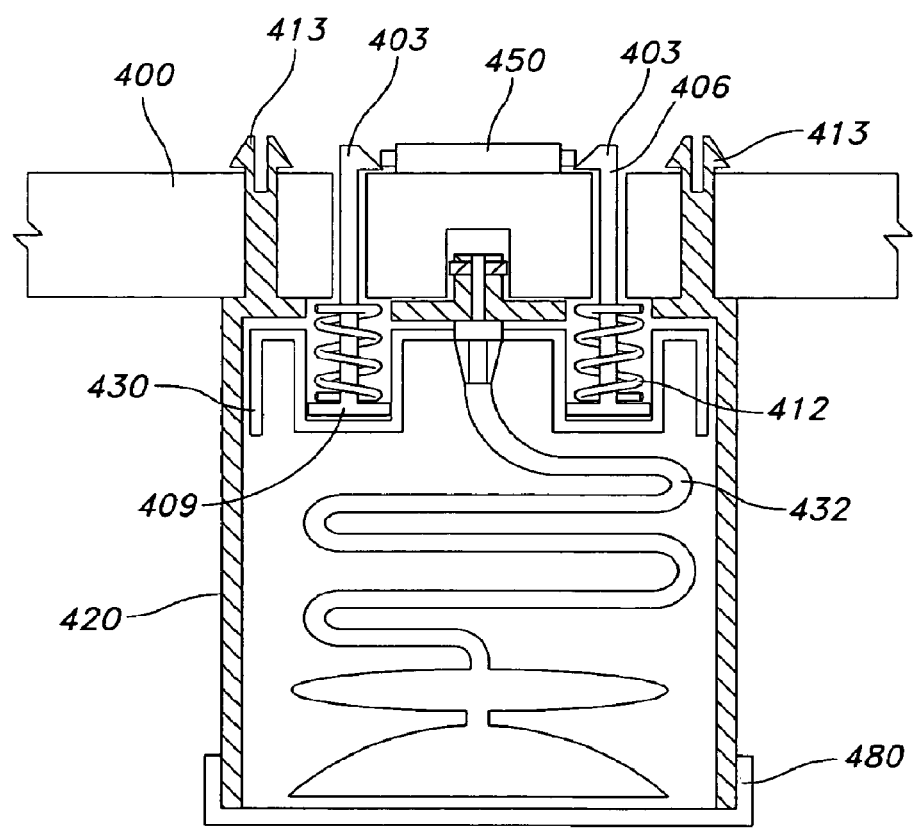
FIG. 12 is a partial elevational cross-sectional view of an alternate embodiment of the cartridge and manifold of the present invention.

Turning to FIGS. 10-12, an alternate embodiment of the invention provides for mounting the springs external to the cartridge. As shown in FIG. 10, manifold 400 supports a pair of latches having a catch member 403, a shaft 406, a head 409 and a pair of springs 412. The springs 412 are pre-loaded in compression between the head 409 and the bottom surface 415 of the manifold 400.

As shown in FIG. 11, a cartridge 420 has a pair of openings 423 in the top wall for receiving the springs 412 and their supporting structure. The cartridge 420 may be provided with studs 413 for mounting the cartridge 420 on the manifold 400. The cartridge 420 also includes a central opening 426 surrounded by an adapter 429. The central opening is in fluid communication with a breathing conduit 432 connected to an oronasal mask assembly. Accordingly, oxygen from the manifold 400 can flow into the breathing conduit 432 when the cartridge 420 is attached to the manifold 400. A spacer member 430 is disposed between the springs 412 and the mask assembly.

Turning to FIG. 12, a solenoid actuated piston assembly 450 is mounted on the manifold 400 and is disposed such that the pistons disengage the catch members 403 from the oxygen manifold 400. Once the catch members 403 are free, the springs 412 push against the spacer member 430 which pushes the mask assembly against the cover 480 and out of the cartridge 420.

It is to be understood that the present invention may be used with all types of aircraft supplemental oxygen delivery systems. There are two primary types of delivery systems: systems whose deployment is initiated by the turning on of a central oxygen supply and systems whose deployment is initiated by an electrical signal. In systems where deployment is initiated by turning on a central oxygen supply, the pneumatic pressure can be used to push the mask out of its container as described above. Because the containers are normally stored in a housing that typically includes a cover, the pneumatic pressure of the oxygen can be used to unlatch the cover or the cover could be unlatched by the masks pressing against the inside of the cover as they are ejected from their containers.

Figure 6C:
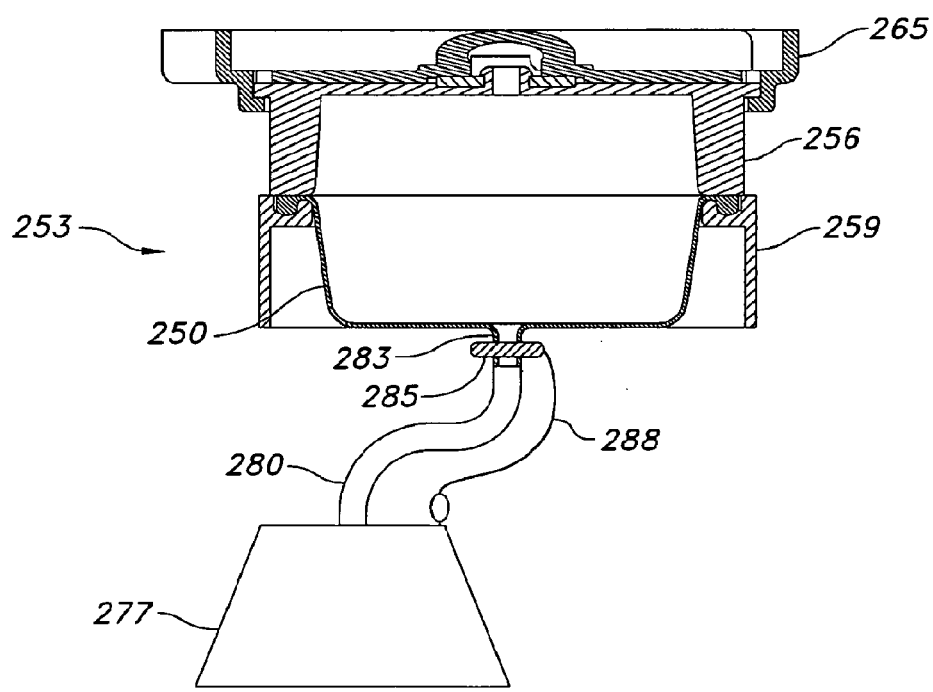
FIG. 6C is a cross-sectional view of a cartridge with a valve located between the diaphragm and the hose to the mask assembly.

There are also systems where deployment is initiated by the turning on of a central oxygen supply; however, in order to conserve oxygen the central oxygen supply is not delivered to the individual masks until users reach for the mask and take an action such as drawing the mask to their face. In this situation, the pressure of the oxygen supply being turned on may be used to open the door of the housing and to provide flow to a bellows or bladder for ejecting the mask. Returning to FIGS. 6C-6E, a valve may be inserted in the oxygen supply to prevent a sustained flow of oxygen out through a mask which is not being used. In FIG. 6C, such an arrangement is shown where the valve 285 is inserted at the point where the hose assembly 280 attaches to a fitting 283 on diaphragm 250. In this case, the valve 285 may be a simple on/off toggle valve or a clip closing off hose assembly 280. This valve may be attached to a lanyard 288 and when mask assembly 277 is pulled to a user's face, the lanyard 288 will actuate the valve 285 or release the clip allowing oxygen to flow. The valve could also be electronic such that it would be activated by the user's drawing in a breath after donning the mask and creating a slight negative pressure in the mask and tubing, which would be sensed by the electronic switch allowing the oxygen to flow.

Figure 6D:
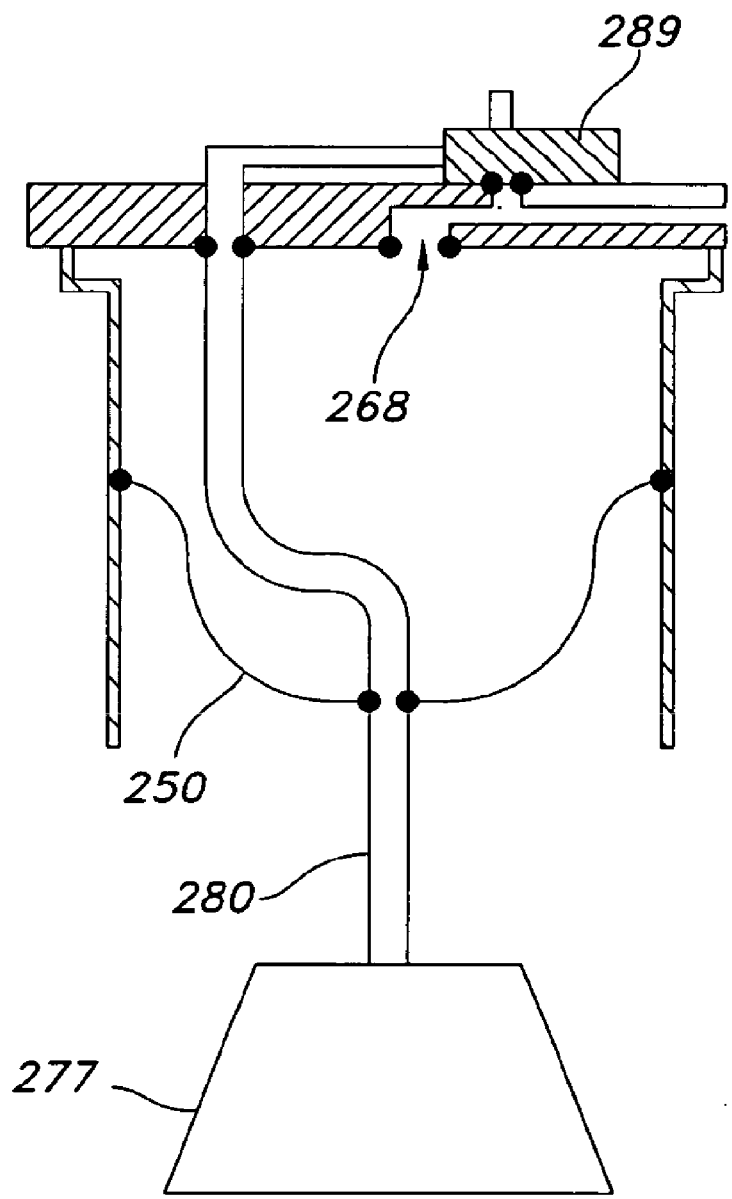
FIG. 6D is a cross-sectional view of an alternate embodiment of the valve for controlling flow to the mask assembly.

FIG. 6D illustrates a switch that may be mounted on the manifold or the cartridge. Oxygen flows into a bellows or bladder ejecting the mask as described previously but cannot flow into the tubing of the mask until the electronic valve 289 senses the presence of a user and allows the oxygen to flow to the mask assembly 277.

Figure 6E:
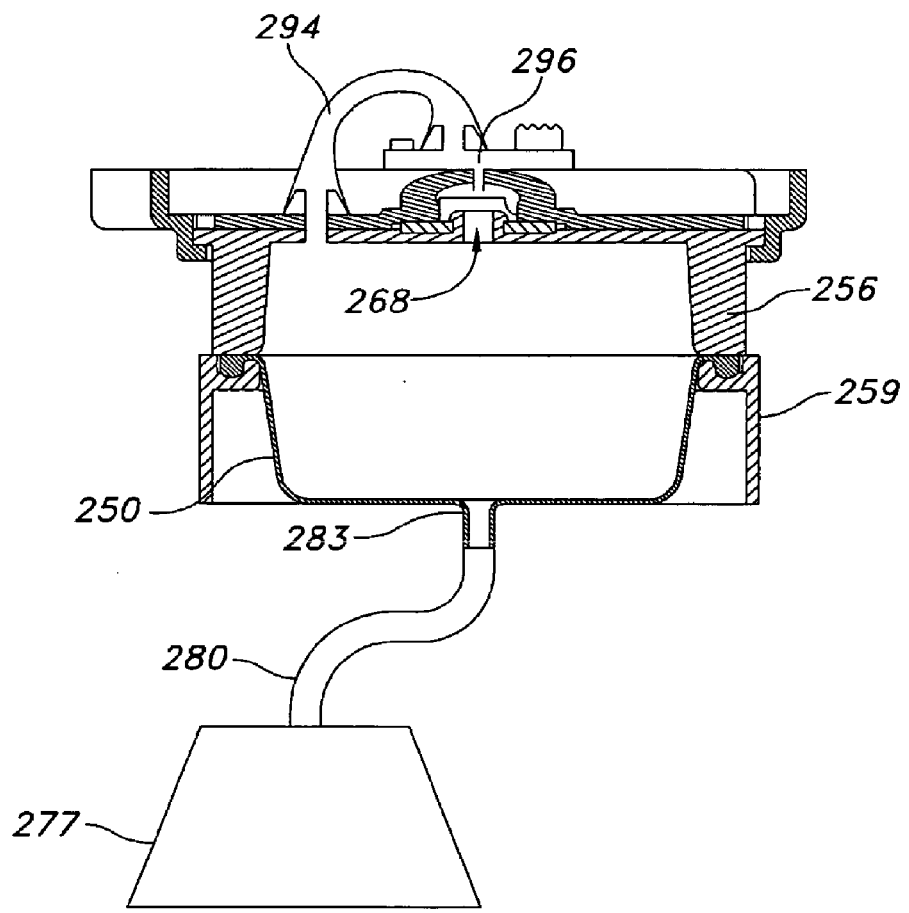
FIG. 6E is a cross-sectional view of another alternate embodiment showing a valve for controlling flow to the mask assembly.

FIG. 6E is a variation of the electronic switch located in the oxygen supply. In this example, the electronic switch 296 allows oxygen to flow into the bellows or bladder through central opening 268, ejecting the mask assembly 277 as described previously. However, the switch 296 is programmed to allow the flow of oxygen to occur for only the length of time needed to eject the mask, after which the oxygen supply is cut off by the electronic switch 296. The electronic switch 296 does not reopen, allowing the flow to continue, until it senses by means of sensor tube 294 that the user is taking a breath.

In systems where deployment of the masks is initiated by an electrical signal, without any flow of oxygen occurring, the oxygen source is often a chemical oxygen generator or a sealed oxygen cylinder serving only the group of masks contained in one or more housings. In such cases in order not to expend an oxygen generator or unseal a sealed cylinder, the oxygen supply may be initiated by the users reaching for the oxygen masks and pulling them toward their faces. Accordingly, the ejection of the masks is not associated with the flow of oxygen as the masks have to be ejected prior to actuation of the source of oxygen gas.

Figure 13:
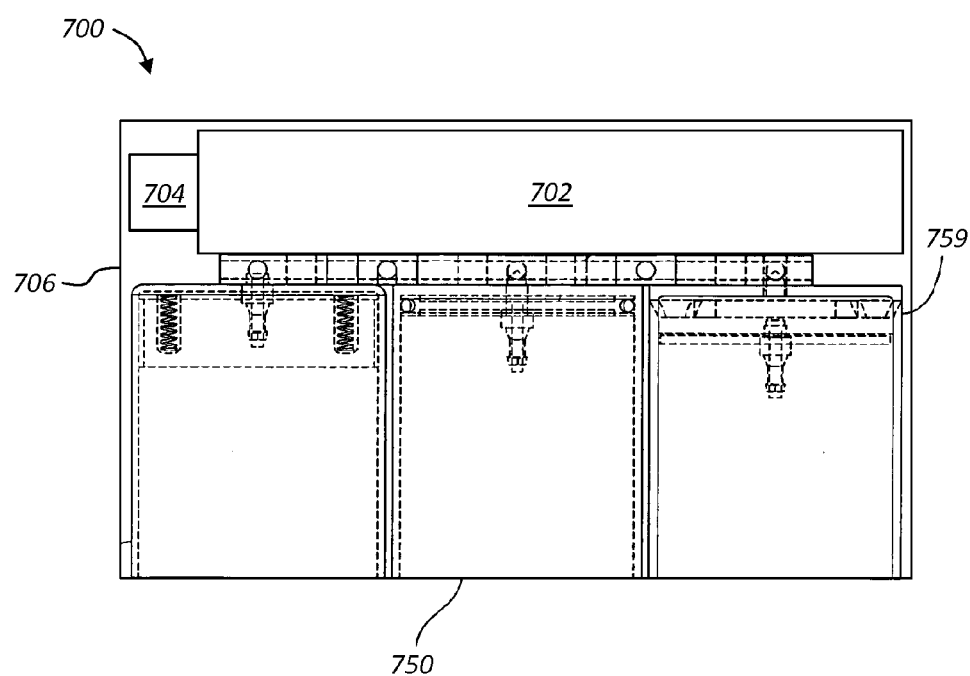
FIG. 13 is a side elevational view of a system having an attached oxygen source according to another embodiment of the present invention.

FIG. 13 depicts an embodiment of the aforementioned system 700 wherein the oxygen source 702, which may be, for example, but not limited to, a chemical oxygen generator, serves only the group of masks contained in one housing (it should be understood that there may be only one mask in the housing). In system 700, the oxygen source 702 is attached to the housing. In other embodiments, the oxygen source 702 may be located at some distance from the housing. The system 700 may include an igniter 704. As described above, the system 700 may be initiated in various ways. For example, ejection of the masks may be caused by the flow of oxygen from the oxygen source 702. In another example, ejection of the masks may be caused by another mechanism such as the spring-biased ejector, and the flow of oxygen may be initiated by the users pulling the oxygen masks towards their faces. Some embodiments of system 700 further comprise an enclosure 706 containing all components of the system 700 including the oxygen source 702.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A mask deployment system for an aircraft comprising:
   a housing with a receiving space, the housing configured to removably couple to the aircraft;
   an intermediate receptacle configured to be removably disposed in the receiving space of the housing, the intermediate receptacle having a passenger oxygen mask in a ready for use state;
   a cover closing the intermediate receptacle and enclosing the passenger oxygen mask in the intermediate receptacle; and
   a housing cover for closing at least the receiving space of the housing thereby enclosing the intermediate receptacle within the housing.

2. The mask deployment system of to claim 1, further comprising a conduit connection between an oxygen connection in the housing and the passenger oxygen mask.

3. The mask deployment system of claim 2, wherein the oxygen connection in the housing is in pneumatic communication with an oxygen source for selectively serving oxygen to the passenger oxygen mask.

4. The mask deployment system of claim 3, wherein the oxygen source is a chemical oxygen generator.

5. The mask deployment system of claim 3, further comprising an oxygen source, wherein the oxygen source serves only the mask contained within the housing.

6. The mask deployment system of claim 5, further comprising:
   one or more additional intermediate receptacle, each additional intermediate receptacle configured to be removably disposed in the receiving space of the housing, and each additional intermediate receptacle having a passenger oxygen mask in a ready for use state, and wherein each passenger oxygen mask is connected to the oxygen connection and in pneumatic communication with the oxygen source; and
   wherein the oxygen source serves only the masks contained within the housing.

7. The mask deployment system of claim 5, wherein the oxygen source is attached to the housing.

8. The mask deployment system of claim 7, wherein the oxygen source is contained within the housing.

9. The mask deployment system according to claim 1, further comprising a mechanical connection between the housing and the intermediate receptacle formed upon installation of the intermediate receptacle into the receiving space of the housing.

10. The mask deployment system of claim 1, wherein the intermediate receptacle includes one or more quick connect mechanical connections configured to mate with one or more quick connect mechanical connections on the housing.

11. The mask deployment system of claim 1, wherein the cover closing the intermediate receptacle seals the passenger oxygen mask in the intermediate receptacle such that the passenger oxygen is pre-packaged in the intermediate receptacle.

12. The mask deployment system of claim 1, wherein the cover closing the intermediate receptacle is spaced apart from, and unattached to, the housing cover.

13. A method for equipping a housing with passenger oxygen masks in an aircraft, the method comprising the steps of:
   arranging a passenger oxygen mask in a ready for use state in a cartridge;
   installing the cartridge with arranged oxygen mask into the housing, the housing configured to removably couple to the aircraft;
   closing the cartridge after the arrangement of the passenger oxygen mask with a cover closing the cartridge; and
   closing the housing with a housing cover to enclose the cartridge in the housing.

14. The method of to claim 13, wherein the step of installing the cartridge further comprises the substep of pneumatically connecting the passenger oxygen mask of the cartridge to an oxygen source of the housing.

* * * * *